(12) United States Patent
    Watanabe

(10) Patent No.: US 10,834,285 B2
(45) Date of Patent: Nov. 10, 2020

(54) PRINTING APPARATUS ADJUSTING PHASE DIFFERENCES OF RECEIVED SIGNALS

(71) Applicant: CANON KABUSHIKI KAISHA, Tokyo (JP)

(72) Inventor: Tatsuro Watanabe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 133 days.

(21) Appl. No.: 15/942,884

(22) Filed: Apr. 2, 2018

(65) Prior Publication Data
    US 2018/0295252 A1    Oct. 11, 2018

(30) Foreign Application Priority Data

Apr. 10, 2017   (JP) ................. 2017-077730

(51) Int. Cl.
    *H04N 1/00*    (2006.01)
    *H04N 1/409*   (2006.01)
(52) U.S. Cl.
    CPC ..... *H04N 1/00933* (2013.01); *H04N 1/00087* (2013.01); *H04N 1/00312* (2013.01); *H04N 1/00931* (2013.01); *H04N 1/409* (2013.01)
(58) Field of Classification Search
    CPC ........... H04N 1/00933; H04N 1/00087; H04N 1/00931; H04N 1/409
    See application file for complete search history.

(56) References Cited

U.S. PATENT DOCUMENTS

| 6,262,758 B1 | 7/2001 | Suzuki et al. ............... 347/237 |
| 2003/0169464 A1* | 9/2003 | Otake ................ H04N 1/00002 358/474 |
| 2006/0104396 A1* | 5/2006 | Soriano ............... G06F 13/4282 375/362 |
| 2007/0210997 A1* | 9/2007 | Kasai ......................... B41J 2/45 345/82 |
| 2013/0083108 A1* | 4/2013 | Sanada .................. B41J 19/205 347/10 |
| 2014/0267479 A1* | 9/2014 | Yamamoto ........... B41J 2/04581 347/10 |
| 2014/0362135 A1* | 12/2014 | Terayama ............ B41J 2/04588 347/10 |
| 2017/0282534 A1* | 10/2017 | Watanabe ............ B41J 2/04586 |

FOREIGN PATENT DOCUMENTS

JP    2008-125017 A    5/2008

* cited by examiner

*Primary Examiner* — Benjamin O Dulaney
(74) *Attorney, Agent, or Firm* — Venable LLP

(57) ABSTRACT

A printing apparatus comprises a plurality of sending units that respectively send signals; a plurality of receiving units provided on a printhead and respectively corresponding to the plurality of sending units, the plurality of receiving units receiving signals via a signal line; and a phase adjustment unit that, based on a phase difference of a plurality of signals respectively received by the plurality of receiving units, controls and outputs a delay of the plurality of signals. Each of the plurality of sending units sends a phase adjustment signal for phase adjustment to be performed by the phase adjustment unit, and a phase adjustment signal sent by a first sending unit includes a signal having a coordinate phase and an opposite phase with respect to a phase adjustment signal sent by a second sending unit.

19 Claims, 9 Drawing Sheets

PRINTING APPARATUS ADJUSTING PHASE DIFFERENCES OF RECEIVED SIGNALS

BACKGROUND OF THE INVENTION

Field of the Invention

The present invention relates to a printing apparatus.

Description of the Related Art

Conventionally, there is a printing apparatus provided with a head unit having a printhead and a printhead control IC (a driver IC for controlling operation of the printhead). In addition, the head unit and an ASIC on a main substrate are connected by a cable for sending and receiving various signals that include printing data.

In recent years, an influence from variation inside an IC has been increasing due to faster LSI processes. Accordingly, clock skew, where errors arise in timing for a clock signal that should be simultaneously transmitted to each unit in a main chip due to a wiring situation or the like, occurs. Due to this clock skew, it becomes difficult to guarantee setup times/hold times for correctly sending data, and a data send error occurs. In a printing apparatus as described above, when sending printing data from an ASIC on a main substrate to a printhead, because communication is via a cable, countermeasures for clock skew are being viewed as more important.

In Japanese Patent Laid-Open No. 2008-125017, a signal for phase adjustment is caused to be output from a sending device at a time of phase adjustment, a phase state for each signal is caused to be detected by a phase detection unit of a receiver, and a delay amount for each signal from a variable delay unit is adjusted by a delay adjustment unit in response to the detected phase state. Consequently, it becomes possible to stably read a data signal.

However, in Japanese Patent Laid-Open No. 2008-125017, phase adjustment that considers inter-symbol-interference of data to be sent, and/or crosstalk noise between signal lines that run parallel cannot be performed.

In a printing apparatus, communication of printing data between a printhead and an ASIC on a main substrate is realized via a plurality of data lines. Because a plurality of pieces of data are sent at the same time, there is a problem that, when crosstalk noise occurs between data lines, this leads to an influence on rising/falling times, and a timing error occurs. In addition, because communication of printing data means sending various data patterns, there is a problem that a timing error also occurs due to interference between symbols that are adjacent.

SUMMARY OF THE INVENTION

According to one aspect of the present invention, there is provided a printing apparatus having a printhead, the printing apparatus comprising: a plurality of sending units configured to respectively send signals; a plurality of receiving units provided on the printhead and respectively corresponding to the plurality of sending units, the plurality of receiving units configured to receive signals via a signal line; and a phase adjustment unit configured to, based on a phase difference of a plurality of signals respectively received by the plurality of receiving units, control and output a delay of the plurality of signals, wherein each of the plurality of sending units sends a phase adjustment signal for phase adjustment to be performed by the phase adjustment unit, and a phase adjustment signal sent by a first sending unit out of the plurality of sending units includes a signal having a coordinate phase and an opposite phase with respect to a phase adjustment signal sent by a second sending unit out of the plurality of sending units.

According to another aspect of the present invention, there is provided a printing apparatus having a printhead, the printing apparatus comprising: a plurality of sending units configured to respectively send signals; a plurality of receiving units provided on the printhead and respectively corresponding to the plurality of sending units, the plurality of receiving units configured to receive signals via a signal line; and a phase adjustment unit configured to, based on a phase difference of a plurality of signals respectively received by the plurality of receiving units, control and output a delay of the plurality of signals, wherein each of the plurality of sending units sends a phase adjustment signal for phase adjustment to be performed by the phase adjustment unit, and phase adjustment signals sent by a first sending unit and a second sending unit out of the plurality of sending units each have a plurality of patterns for patterns of at least two continuous symbols.

By virtue of the present invention, it is possible to perform a skew adjustment in consideration of the influence of crosstalk noise between a plurality of data lines, and/or a timing shift due to inter-symbol-interference.

Further features of the present invention will become apparent from the following description of exemplary embodiments (with reference to the attached drawings).

DESCRIPTION OF THE EMBODIMENTS

First Embodiment

Using the drawings, description is given below regarding an embodiment of the invention of the present application. Note that configurations illustrated below are examples, and there is no limitation to them.

[Apparatus Configuration]

Figure 1:
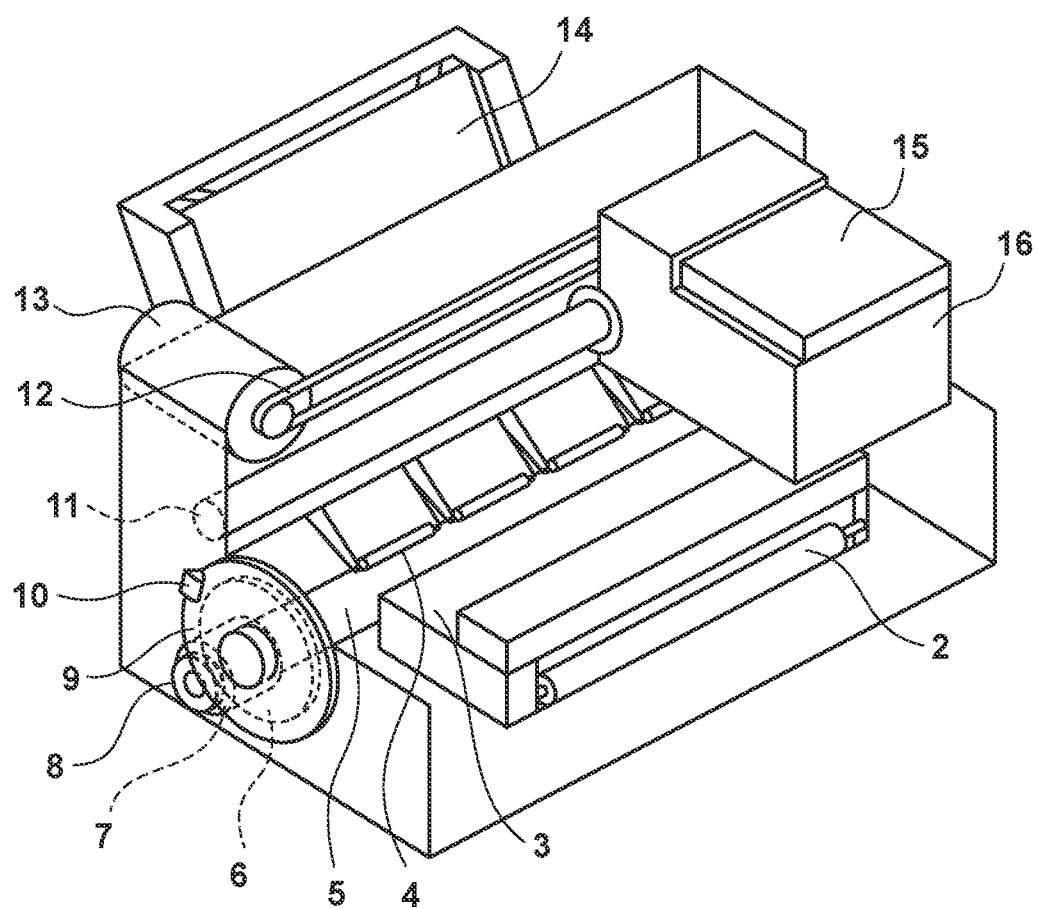
FIG. 1 is a view illustrating an example of a main mechanical portion of a printing apparatus according to embodiments.

FIG. 1 is a view illustrating a main mechanical portion of a printing apparatus to which the present invention can be applied. A printing apparatus 1 indicates an apparatus main body of an ink-jet printer. A discharge roller 2 conveys a printing medium 14 such as paper to which an image has been printed to the outside of the printing apparatus 1. A platen 3 is positioned on a bottom surface of a printing surface. A sheet pressing roller 4 is used to press the printing medium 14. A sheet conveyance gear 6 is a gear that functions when the printing medium 14 is conveyed. A sheet conveyance motor 7 is a motor for driving a sheet conveyance roller 5 via the sheet conveyance gear 6 and a sheet conveyance motor gear 8.

An encoder film 9 rotates in synchronization with the sheet conveyance motor 7. An analog encoder sensor 10 detects a slit marked on the encoder film 9 to detect a position of the sheet conveyance motor 7, and performs generation of a print timing. A printhead 15 has a nozzle array comprised of a plurality of nozzles for discharging ink. A carriage 16 is mounted with the printhead 15, and scans the printhead 15 in a scanning direction that is orthogonal to a conveyance direction of the printing medium 14. A shaft 11 is a shaft for fixing the carriage 16. A belt 12 and a monitor 13 are used for driving the carriage 16.

FIG. 1 illustrates an example of a scan type printing apparatus, but there is no limitation to this configuration, and the invention of the present application can also be applied to another configuration if it is a configuration of a printing apparatus where the problem to be solved of the invention of the present application occurs. For example, it may be a full-line printing apparatus.

Figure 2:
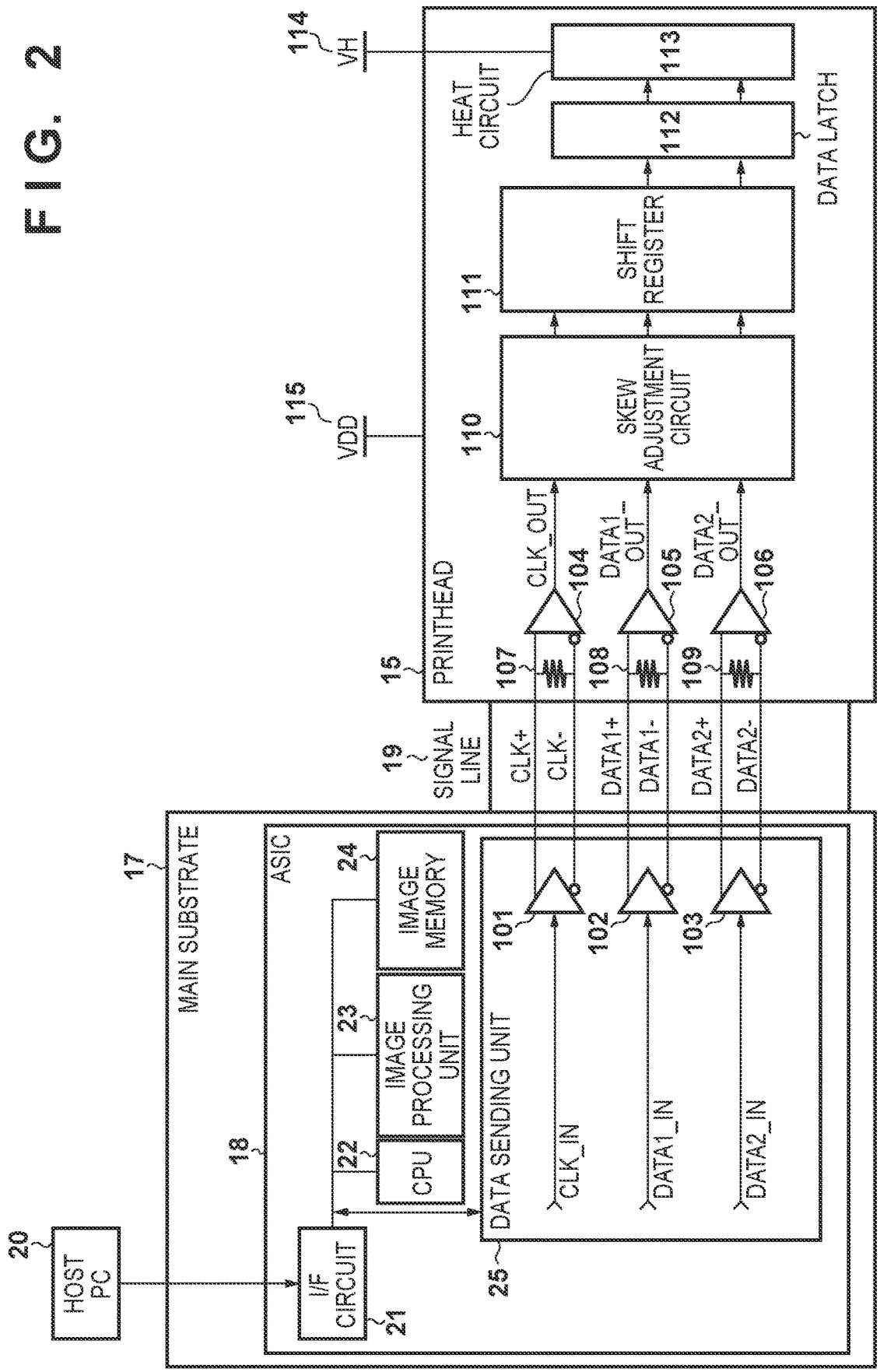
FIG. 2 is a view illustrating a schematic configuration of a printing apparatus according to embodiments.

FIG. 2 illustrates a schematic configuration diagram of the printing apparatus 1 according to the present embodiment. In FIG. 2, a host PC 20 and a main substrate 17 installed in the printing apparatus 1 are communicably connected. The host PC 20 is an information processing apparatus for a user to perform an instruction for generation of a print material or execution of printing or the like, and corresponds to a typical PC (Personal Computer) or the like. In addition, in the printing apparatus 1, the main substrate 17 and the printhead 15 are connected via a signal line 19.

The main substrate 17 is provided with an ASIC (Application Specific Integrated Circuit) 18 for performing control of the printing apparatus 1. The printhead 15 is a printhead for discharging ink to perform image formation, and can be removed from the printing apparatus 1 main body and exchanged. In the present embodiment, description is given for the signal line 19 as something connected by a flexible flat cable.

The ASIC 18 provided in the main substrate 17 of the printing apparatus 1 is configured by including an interface (I/F) circuit 21, a CPU 22, an image processing unit 23, an image memory 24, and a data sending unit 25. Printing data or a control command sent from the host PC 20 is received by the I/F circuit 21 that the ASIC 18 is provided with. A received control command is analyzed by the CPU 22, and control of the printing apparatus 1 in accordance with this control command is performed. In addition, printing data received by the I/F circuit 21 is sent to the image processing unit 23, various image processing in accordance with a printing method is applied, and a result of the image processing is stored in the image memory 24 as print data. The stored print data is re-read at a time of a print operation. The data sending unit 25 sends the print data that was subject to image processing to the printhead 15.

In the present embodiment, in a configuration where a plurality of wiring lines of the signal line 19 run parallel, it is assumed that a corresponding sending unit and receiving unit send and receive signals by a differential transmission method.

Differential transmission drivers 101, 102, and 103 are drivers for converting a clock (CLK_IN) and data (DATA1_IN and DATA2_IN) sent in a single-ended format to differential transmission signals (CLK+, CLK−, DATA1+, DATA1−, DATA2+, and DATA2−) and sending them to the printhead 15.

Differential transmission receivers 104, 105, and 106 are receivers for converting differential transmission signals for a clock and data respectively outputted from the differential transmission drivers 101 through 103 to single-ended format signals (CLK_OUT, DATA1_OUT, and DATA2_OUT). In addition, terminating resistors 107, 108 and 109 are resistors for terminating respective differential transmission signal lines. In the present embodiment, differential transmission signals of a Low Voltage Differential Signaling (LVDS) standard are employed.

Note that, in the present embodiment, in order to simplify the description, in the signal line 19 for connecting a main body side of the printing apparatus 1 with a printhead 15 side, a send/receive configuration comprising lines for one clock and lines for two pieces of data is given. However, there is no limitation to this configuration, and, for example, a configuration that includes lines for even more pieces of data may be taken.

A skew adjustment circuit 110 is a circuit for adjusting a phase state of a clock signal and respective data signals outputted from the differential transmission receivers 104 through 106 to let the data signals be read stably. Output by the skew adjustment circuit 110 is inputted to a shift register 111. Output of the skew adjustment circuit 110 is one output of a clock signal and two outputs for data signals. Furthermore, output by the shift register 111 is inputted to a data latch 112. The shift register 111 converts respective pieces of data that were sent as serial data to parallel data, and outputs this to the data latch 112. The data latch 112 temporarily stores data outputted from the shift register 111. A heat circuit 113 is driven by receiving nozzle information for discharging ink or heat pulse width information that signifies an amount of time for heating a heater (not shown), which are outputted from the data latch 112. A heater driving power supply (VH) 114 for driving the heat circuit 113 in accordance with the output data from the data latch 112 is supplied to the heat circuit 113. A digital power supply (VDD) 115 is a power supply for driving a digital circuit mounted in the printhead 15.

Figure 3:
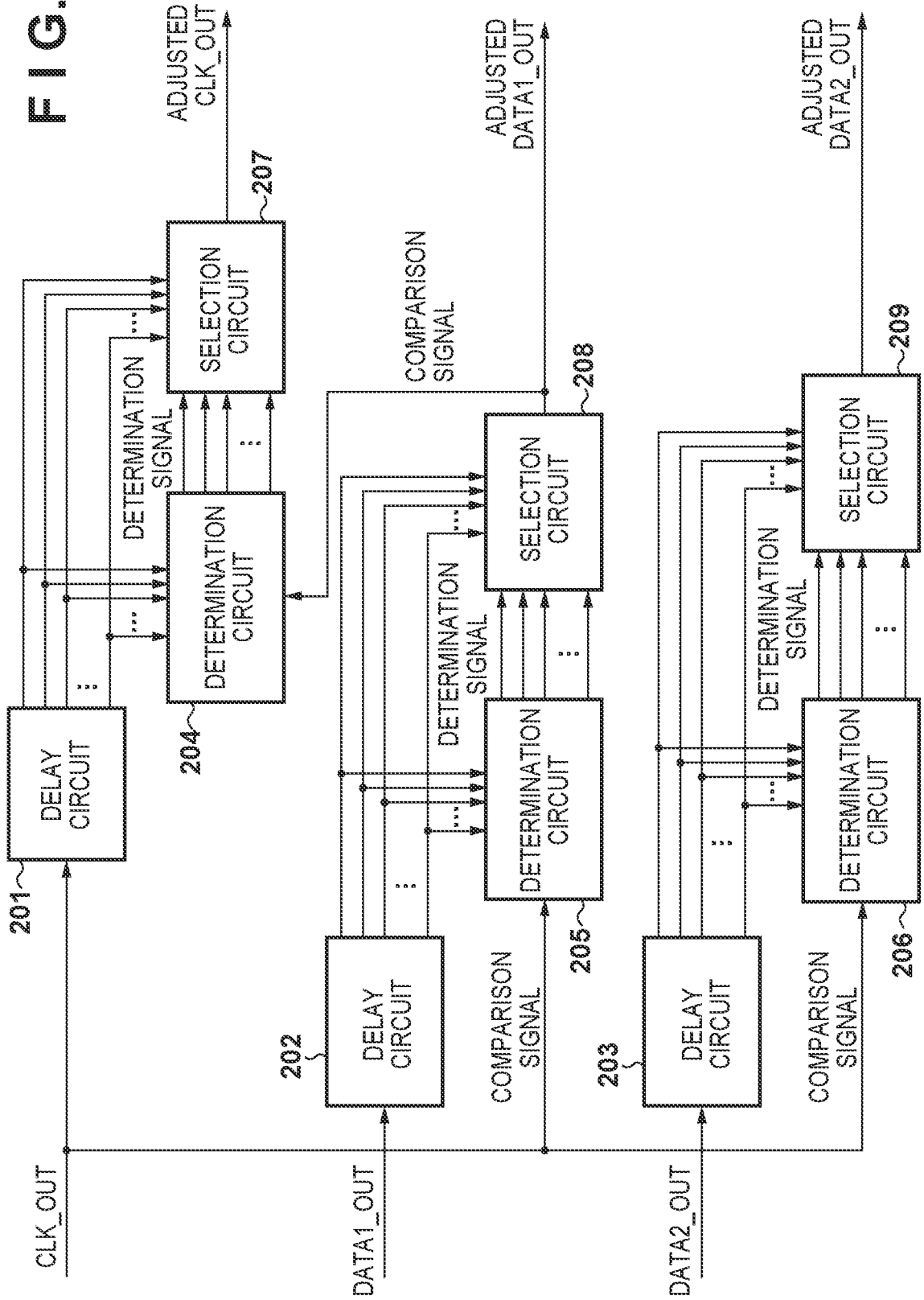
FIG. 3 is a view illustrating an example of a configuration of a skew adjustment circuit according to embodiments.

FIG. 3 is a view illustrating an example of a circuit configuration of the skew adjustment circuit 110 according to the present embodiment. Delay circuits 201, 202, and 203 are delay circuits for delaying CLK_OUT, DATA1_OUT, and DATA2_OUT by only a predetermined delay time, and then outputting them. Each delay circuit delays input signals by predetermined delay times in a multistage manner to thereby output a plurality of signals that are delayed by different delay times. Determination circuits 204, 205, and 206 are determination circuits for outputting a determination signal based on a phase difference between each comparison signal and a signal delayed by a predetermined delay time. Selection circuits 207, 208, and 209 are selection circuits for selecting a plurality of outputs of the delay circuits 201, 202, and 203 based on the determination signals outputted from the determination circuits 204, 205, and 206. The signals outputted from the selection circuits 207, 208, and 209 are used as signals for sending data (signals after adjustment).

[Processing Sequence]

Figure 4:
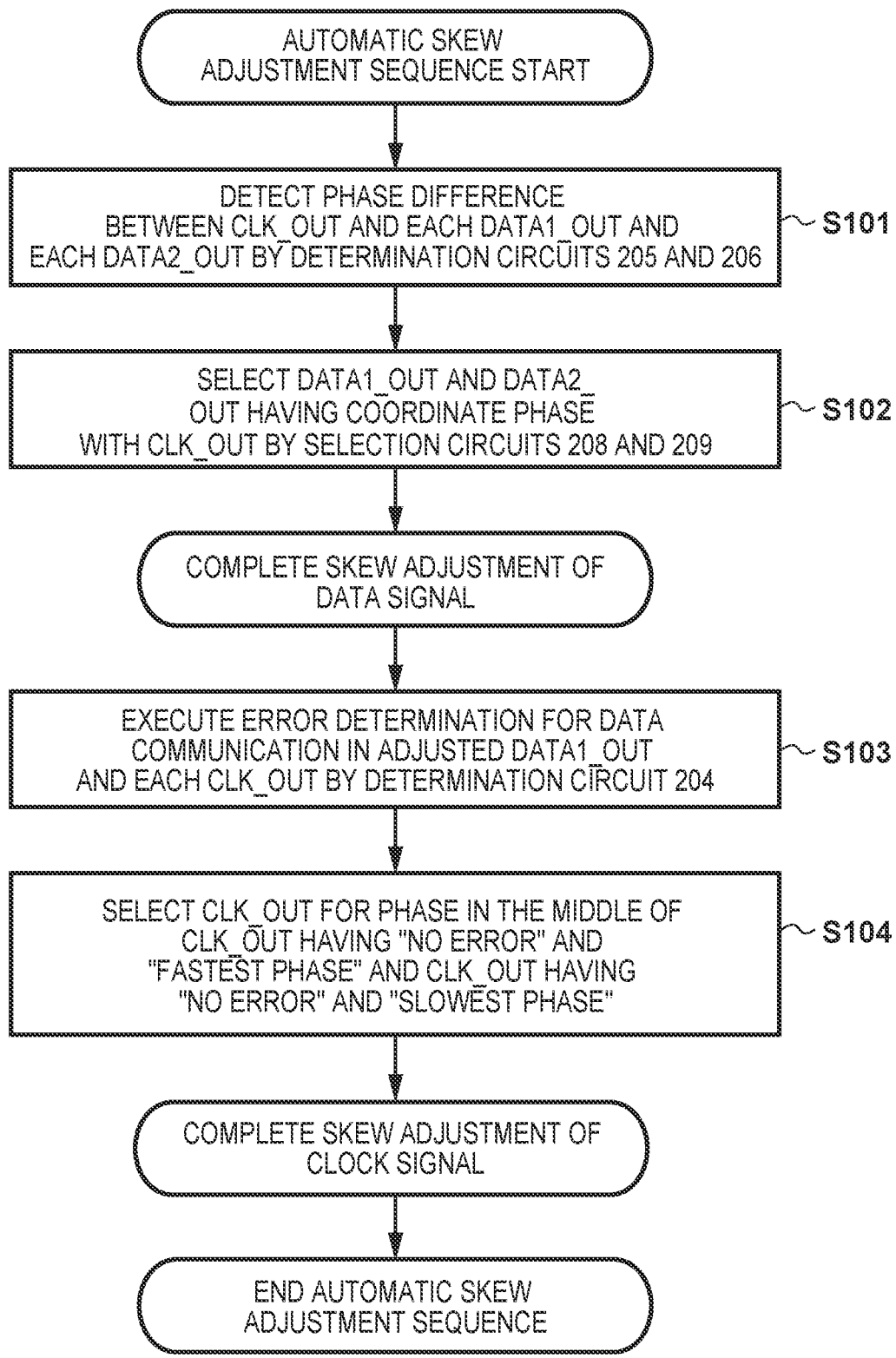
FIG. 4 is a flowchart illustrating a skew adjustment sequence according to embodiments.

FIG. 4 is a flowchart for illustrating a skew adjustment sequence that is performed by the skew adjustment circuit 110. By step S101 through step S102 that are described below, a skew adjustment of a data signal is performed, and by step S103 through step S104 a skew adjustment of a clock signal is performed. In the present embodiment, this processing is performed by using a command for skew adjustment that is described later as an input.

In step S101, the determination circuits 205 and 206 perform a phase difference detection between the plurality of data signals respectively delayed by different delay times and outputted from the delay circuits 202 and 203 with respect to the comparison signal CLK_OUT. Both of the delay circuits 202 and 203 use CLK_OUT as the comparison signal. The phase difference detection here compares the comparison signal CLK_OUT with the plurality of data signals to identify a data signal whose phase matches. The determination circuits 205 and 206 output, as a determination signal with respect to a determination result, a signal indicating a data signal whose phase matched, for example, and outputs a different signal with respect to other data signals.

In step S102, the selection circuits 208 and 209, based on the determination signal outputted as the determination result of the determination circuits 205 and 206, select from the plurality of data signals having different delay times DATA1_OUT and DATA2_OUT that have a coordinate phase with CLK_OUT as adjusted DATA1_OUT and adjusted DATA2_OUT. DATA1_OUT and DATA2_OUT selected in step S102 are the data signals that are used in actual data communication. In addition, the adjusted DATA1_OUT selected by the selection circuit 208 in step S102 is the comparison signal used by the determination circuit 204.

In step S103, the determination circuit 204 performs an error determination for each data communication for the adjusted DATA1_OUT that is the comparison signal for the clock signal outputted from the delay circuit 201. The clock signal outputted from the delay circuit 201 is a plurality of clock signals respectively delayed by different delay times. Details of the error determination are described using FIG. 5.

In step S104, from determination results by the determination circuit 204, the selection circuit 207 selects a CLK_OUT having a phase in the middle of a CLK_OUT having "no error" and "fastest phase" and a CLK_OUT having "no error" and "slowest phase" as the adjusted CLK_OUT. The CLK_OUT selected in step S104 is the clock signal used in actual data communication. This processing flow is then terminated.

Figure 5:
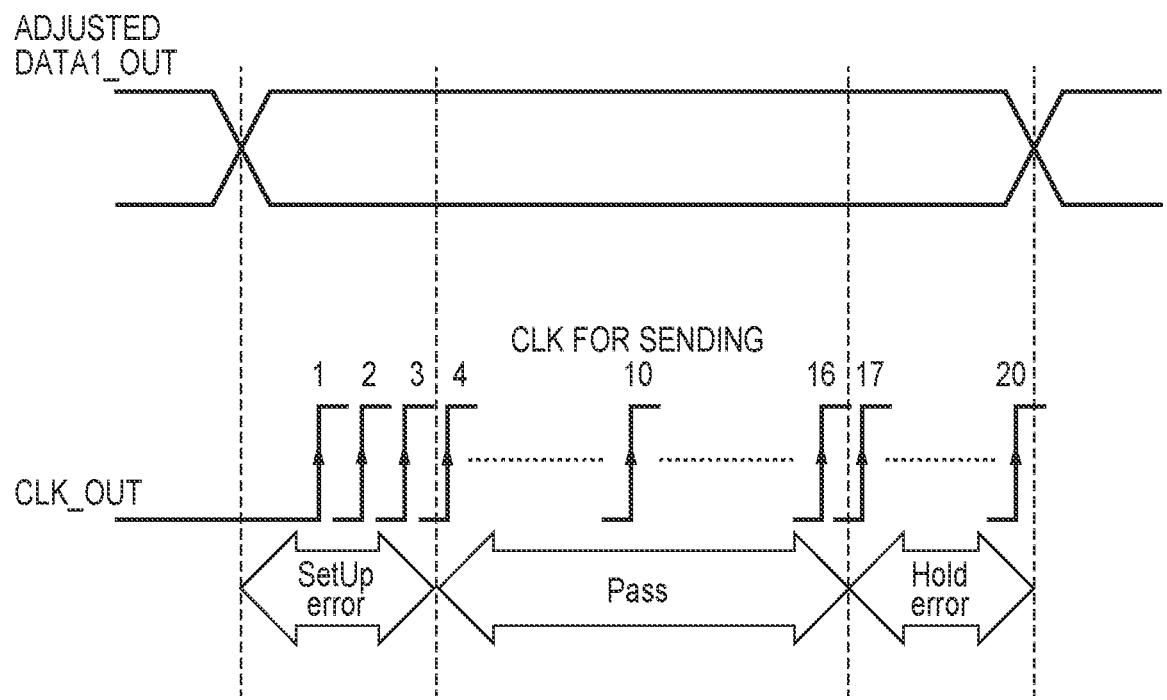
FIG. 5 is a view for describing a concrete example of the skew adjustment sequence according to embodiments.

FIG. 5 is a view for describing a concrete example of the skew adjustment sequence illustrated by FIG. 4. A top portion of FIG. 5 illustrates switching of adjusted DATA1_OUT signals outputted from the selection circuit 208 as the comparison signal at the time of a skew adjustment. A setup error and a hold error occur due to a rising timing of CLK_OUT. Clocks 1 through 20 indicate clocks of a plurality of stages that have different phases and are outputted from the delay circuit 201. In other words, the clocks 1 through 20 illustrated in FIG. 5 are a plurality of clock signals obtained as results of the delay circuit 201 delaying CLK_OUT by different delay times. The delay circuit 201 sends in an order from the clock 1 to the clock 20, and the determination circuit 204 compares these clocks with the comparison signal (adjusted DATA1_OUT here) to thereby perform respective error determinations. The selection circuit 207 selects the clock 10 which has a phase in the middle of the clock 4 which has the fastest phase for which an error (setup error) did not occur, and the clock 16 which has the slowest phase for which an error (hold error) did not occur. The determination circuit 204 outputs a determination signal indicating the selected clock 10 to the selection circuit 207. Subsequently, from the plurality of clock signals delayed by differing delay times by the delay circuit 201, the selection circuit 207 selects the clock 10 as the adjusted CLK_OUT for data sending here, and sends this to the shift register 111. By selecting a clock as described above, it is possible to prevent a timing error at a time of sending data.

[Command for Skew Adjustment]

Figure 6A:
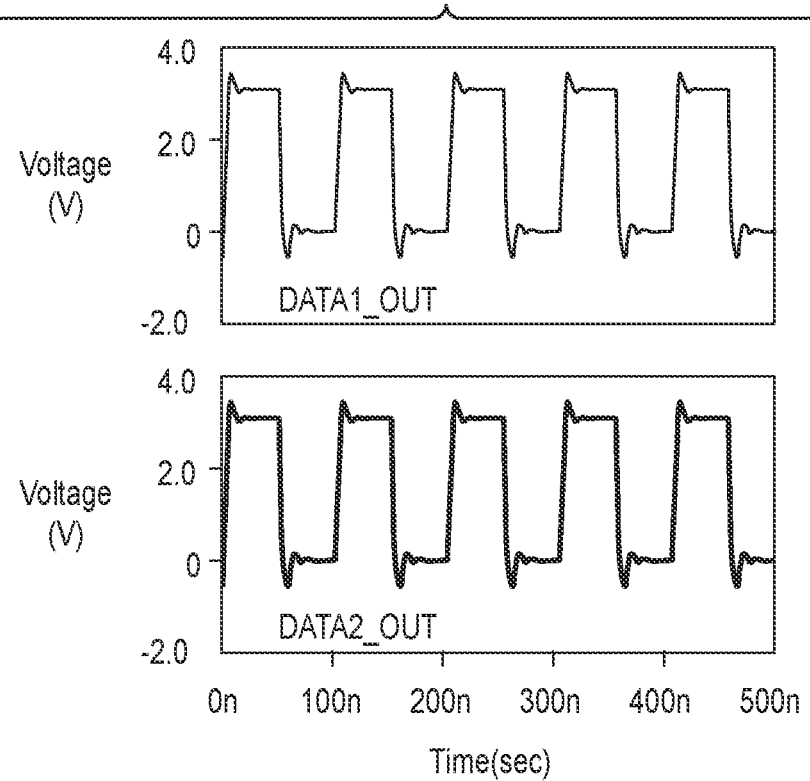
FIGS. 6A, 6B, 6C, and 6D are views for describing a timing shift due to crosstalk noise.
Figure 6B:
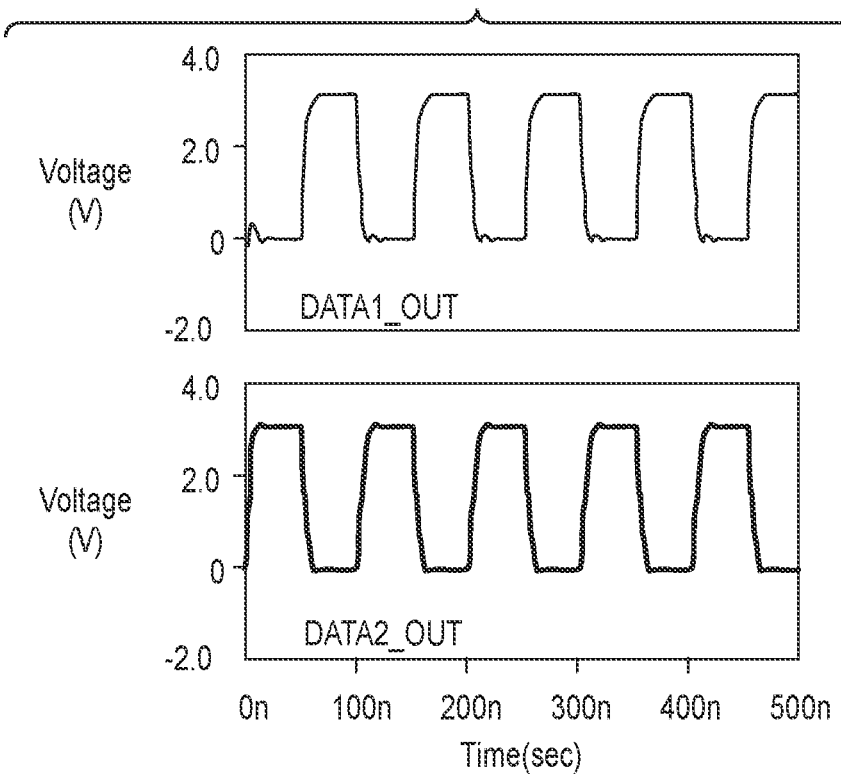
Figure 6C:
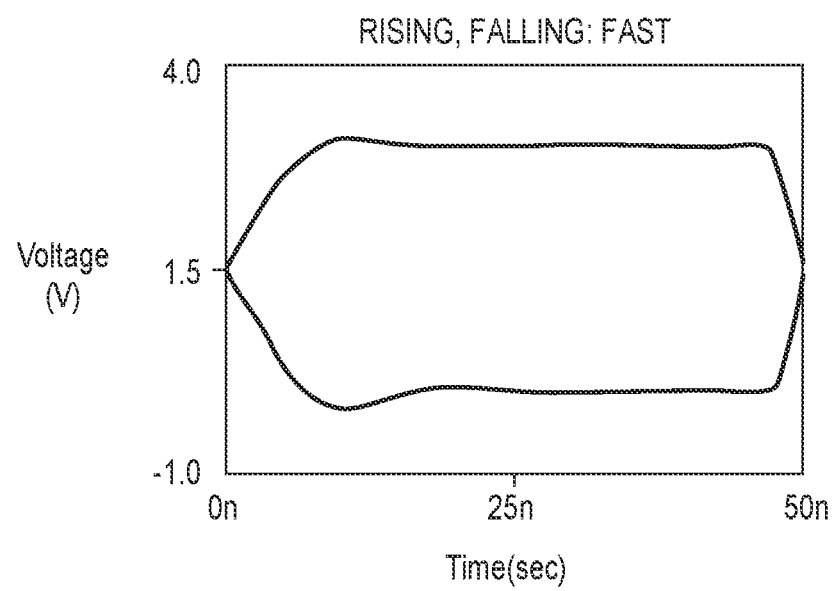
Figure 6D:
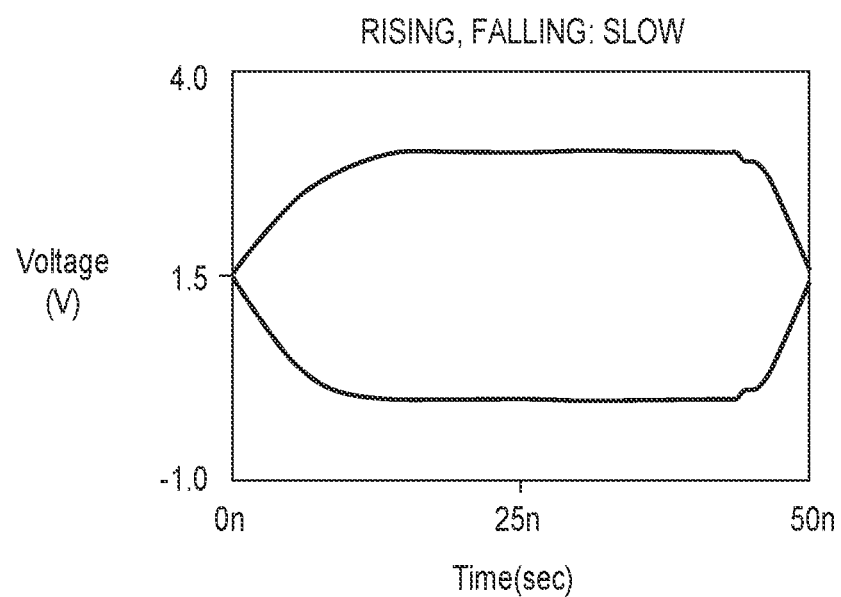

FIGS. 6A through 6D are views for describing a timing shift due to crosstalk noise. In FIGS. 6A through 6D, the ordinate indicates a voltage [V], and the abscissa indicates the passage of time [sec]. FIG. 6A is a timing chart for sending coordinate-phase data patterns in DATA1_OUT and DATA2_OUT. FIG. 6B is a timing chart for sending opposite-phase data patterns in DATA1_OUT and DATA2_OUT. FIG. 6C and FIG. 6D are views that each illustrate an eye pattern in which signal patterns are overlapped at the rising and falling timings of DATA1_OUT illustrated by FIG. 6A and FIG. 6B, respectively.

Because DATA1_OUT and DATA2_OUT according to the present embodiment are signals that run parallel, they are influenced by crosstalk noise. Accordingly, while the rising/falling times get faster in FIG. 6C, the rising/falling times in FIG. 6D get slower. Sending data for the printing apparatus is sending respectively different data patterns to DATA1_OUT and DATA2_OUT, so timing characteristics differ (change) in accordance with relatedness of the data patterns that are sent. In other words, the rising/falling times get faster or slower in accordance with the relatedness of data patterns for DATA1_OUT and DATA2_OUT which are sent.

By performing a skew adjustment in consideration with a change of timing characteristics due to data patterns, as stated above, it is possible to realize more stable obtainment of data. Accordingly, in the present embodiment, a command for skew adjustment (a phase adjustment signal) that is indicated below is used when performing a skew adjustment. In other words, in the present embodiment, when automatically adjusting skew as illustrated in FIG. 4, the command for skew adjustment is inputted as DATA1_IN and DATA2_IN. Based on this command, the skew adjustment circuit 110 performs a skew adjustment using each signal outputted from the main substrate 17 (DATA1, DATA2).

Figure 7:
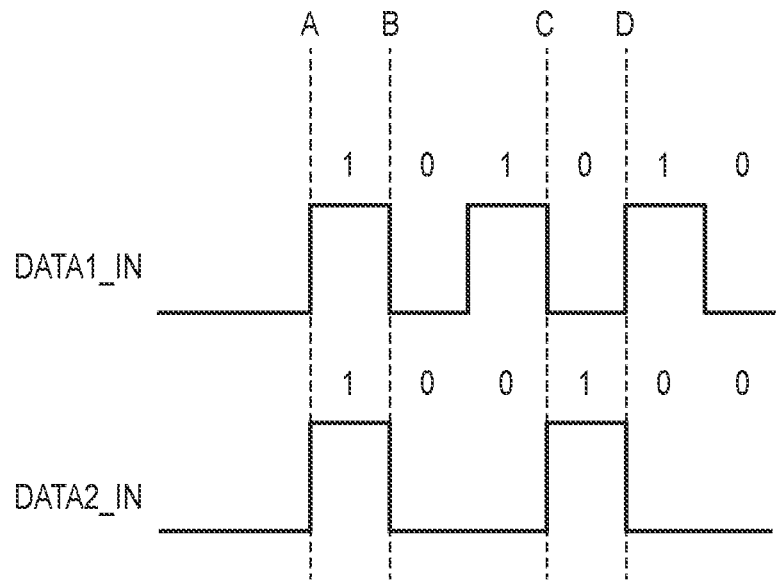
FIG. 7 is a view illustrating a command for skew adjustment according to a first embodiment.

FIG. 7 is a view that illustrates a command for skew adjustment that considers change of timing characteristics that occur when coordinate-phase and opposite-phase data are sent. Here, when performing a skew adjustment, a command (signal) of "101010" is sent to DATA1_IN, and a command (signal) of "100100" is sent to DATA2_IN. At A and B shown in FIG. 7, DATA1_IN and DATA2_IN have a coordinate phase data pattern, and at C and D, DATA1_IN and DATA2_IN have opposite phase data patterns. Accordingly, by using the command for skew adjustment, skew adjustment that considers timing shift due to crosstalk noise between data lines is possible. At a time of skew adjustment, the command for skew adjustment that includes the foregoing configuration is outputted via the signal line 19 to the printhead 15 from the data sending unit 25 as DATA1_IN and DATA2_IN. A skew adjustment by the skew adjustment circuit 110 that uses DATA1_OUT and DATA2_OUT based on this command for skew adjustment is then performed. As described above using FIG. 5, as a result of performing a skew adjustment on DATA1_OUT, the adjusted DATA1_OUT outputted from the selection circuit 208 is used in a comparison with a plurality of CLK_OUT delayed by differing delay times.

Note that a timing for sending the command for skew adjustment (a timing for performing the skew adjustment) for example may be a timing immediately prior to performing image formation, or a predetermined timing may be defined as a period for performing a phase adjustment (a skew adjustment mode). Accordingly, a timing for performing a skew adjustment according to the present embodiment is not particularly limited.

Accordingly, by the present embodiment, when sending data to a printhead of a printing apparatus, a skew adjustment that considers the influence of crosstalk noise between a plurality of data lines is possible.

Second Embodiment

In the second embodiment, description is given regarding a skew adjustment that considers a timing shift due to inter-symbol-interference (ISI). Note that description of a configuration that is the same as that of the first embodiment is omitted.

Figure 8:
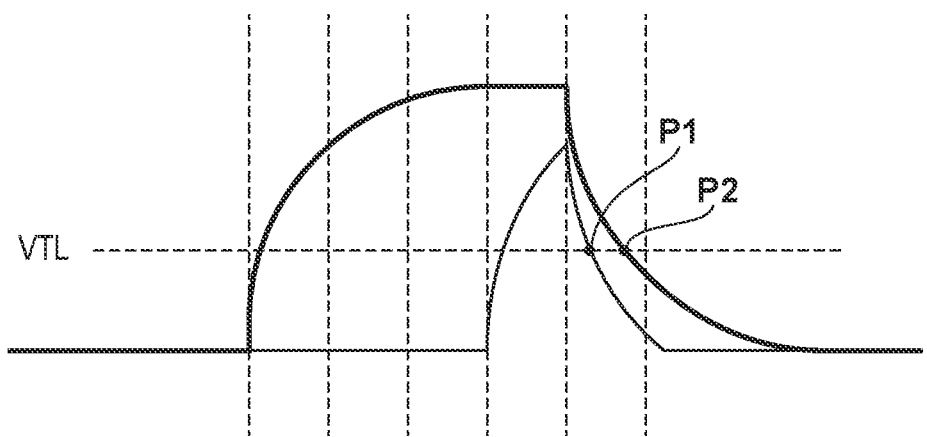
FIG. 8 is a view illustrating a timing shift due to inter-symbol-interference.

FIG. 8 is a view for describing a timing shift due to inter-symbol-interference. By interference occurring between symbols that are adjacent (in other words, between signals in sequence when sending) times P1 and P2 for transitioning to the voltage VTL (a threshold value) for detecting change from a High-level to a Low-level are different as with a pattern 1 and a pattern 2 in the transmission data. As a result, there is a possibility of a timing shift occurring. In other words, in accordance with patterns of transmission data, timings identified as a signal change (an edge portion of a signal) differ. Accordingly, for example, timings grasped as setup error start times or hold error end times as illustrated by the top portion of FIG. 5 differ.

To handle sending various data patterns when sending data in a printing apparatus, in the present embodiment, it is possible to realize more stable obtainment of data by performing a skew adjustment that considers the influence of inter-symbol-interference.

Figure 9:
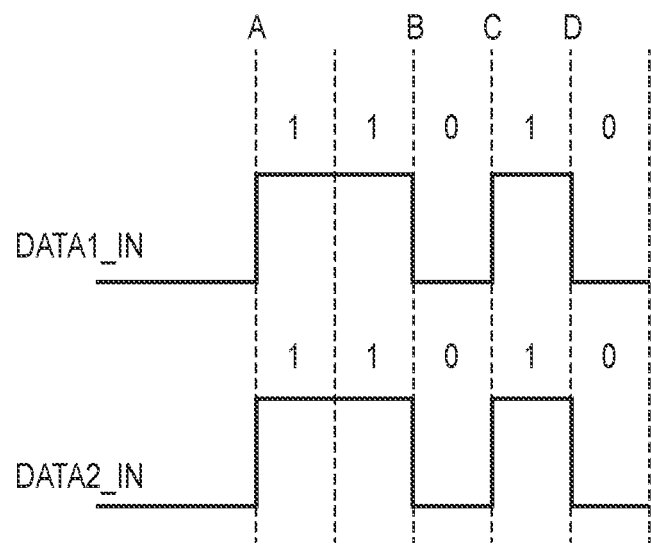
FIG. 9 is a view illustrating a command for skew adjustment according to a second embodiment.

FIG. 9 is a view that indicates a command for skew adjustment that considers the influence of inter-symbol-interference, according to the present embodiment. In the present embodiment, at the time of the skew adjustment of FIG. 4, the command for skew adjustment indicated by FIG. 9 is used instead of the command for skew adjustment of FIG. 7, which is indicated in the first embodiment. Here, a command of "11010" is sent to DATA1_IN and DATA2_IN at the time of a skew adjustment. In FIG. 9, A indicates a pattern where there is a transition from a state where Low has continued for a time to High. B indicates a pattern where there is a transition from a state where High has continued for a time to Low. C indicates a pattern where there is a transition from a state where Low has continued for 1 bit to High. D indicates a pattern where there is a transition from a state where High has continued for 1 bit to Low. The command indicated in FIG. 9 is a command where an anteroposterior relationship of symbols in sequence is a plurality of types. In other words, the command according to the present embodiment is a configuration where a combination of the anteroposterior relationship of symbols includes a plurality of patterns. Accordingly, by using the command for skew adjustment, skew adjustment that considers timing shift due to inter-symbol-interference is possible. At a time of skew adjustment, the command for skew adjustment that includes the foregoing configuration is outputted via the signal line 19 to the printhead 15 from the data sending unit 25 as DATA1_IN and DATA2_IN. A skew adjustment by the skew adjustment circuit 110 that uses DATA1_OUT and DATA2_OUT based on this command for skew adjustment is then performed. Note that description regarding CLK_IN is similar to that in the first embodiment.

Accordingly, by the present embodiment, when sending data to a printhead of a printing apparatus, a skew adjustment that considers a timing shift due to inter-symbol-interference is possible.

Third Embodiment

In the third embodiment, description is given regarding a skew adjustment that considers the influence of crosstalk noise between a plurality of data lines and the influence of inter-symbol-interference that are described by the first and second embodiments. Note that description of a configuration that is the same as that of the first embodiment is omitted.

Figure 10:
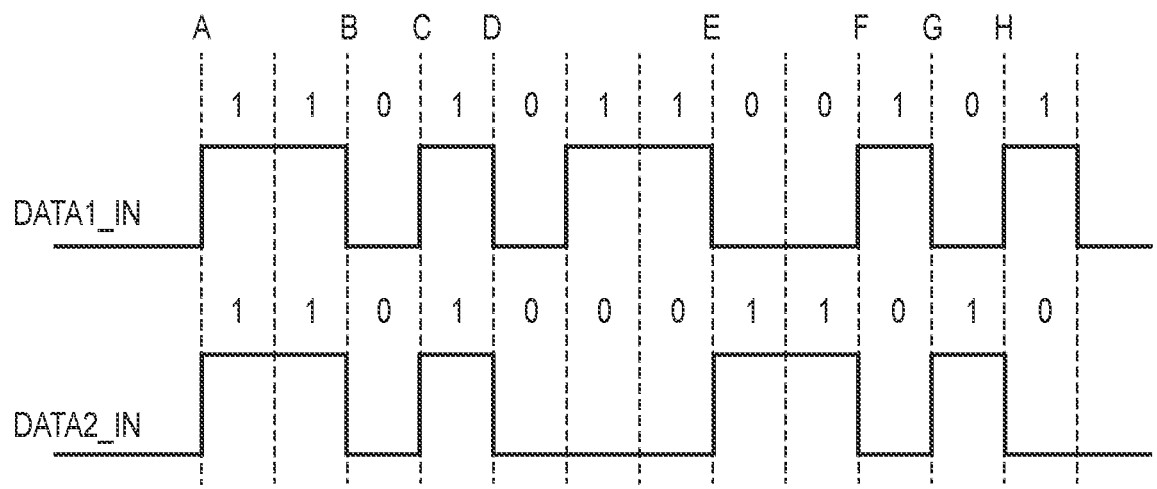
FIG. 10 is a view illustrating a command for skew adjustment according to a third embodiment.

FIG. 10 is a view that indicates a skew adjustment command according to the present embodiment that considers the influence of crosstalk noise between a plurality of data lines and the influence of inter-symbol-interference. In the present embodiment, at the time of the skew adjustment of FIG. 4, the command for skew adjustment indicated by FIG. 10 is used instead of the command for skew adjustment of FIG. 7 which is indicated in the first embodiment. Here, when performing a skew adjustment, a command of "110101100101" is sent to DATA1_IN, and a command of "110100011010" is sent to DATA2_IN. In FIG. 10, at A through D DATA1_IN and DATA2_IN have a coordinate-phase data pattern, and at E through H, DATA1_IN and DATA2_IN have opposite-phase data patterns. Accordingly, by using the command for skew adjustment, skew adjustment that considers timing shift due to crosstalk noise between data lines is possible.

In this skew adjustment command, A indicates a pattern where there is a transition from a state where Low has continued for a time to High. B indicates a pattern where there is a transition from a state where High has continued for a time to Low. C indicates a pattern where there is a transition from a state where Low has continued for 1 bit to High. D indicates a pattern where there is a transition from a state where High has continued for 1 bit to Low. In other words, the command indicated in FIG. 10 is a command where there is a plurality of types of anteroposterior relationships between symbols. In other words, the command according to the present embodiment is a configuration that considers the problems of both of the first and second embodiments, where a combination of the anteroposterior relationship of symbols includes a plurality of patterns. Accordingly, by using the command for skew adjustment, skew adjustment that considers timing shift due to inter-symbol-interference is possible. At a time of skew adjustment, the command for skew adjustment that includes the foregoing configuration is outputted via the signal line 19 to the printhead 15 from the data sending unit 25 as DATA1_IN and DATA2_IN. A skew adjustment by the skew adjustment circuit 110 that uses DATA1_OUT and DATA2_OUT based on this command for skew adjustment is then performed. Note that description regarding CLK_IN is similar to that in the first embodiment.

Accordingly, by the present embodiment, when sending data to a printhead of a printing apparatus, a skew adjustment that considers a timing shift due to inter-symbol-interference and the influence of crosstalk noise between a plurality of data lines is possible. In addition, when sending data to a printhead of a printing apparatus as described above, by performing a skew adjustment that considers a timing shift due to inter-symbol-interference and the influence of crosstalk noise between a plurality of data lines, it is possible to stably obtain data that is sent.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-077730, filed Apr. 10, 2017, which is hereby incorporated by reference herein in its entirety.

What is claimed is:

1. A printing apparatus having a printhead, the printing apparatus comprising:
a plurality of sending units configured to respectively send signals;
a plurality of receiving units provided on the printhead and respectively corresponding to the plurality of sending units, the plurality of receiving units configured to receive signals via a signal line; and
a phase adjustment unit configured to, based on a phase difference of a plurality of signals respectively received by the plurality of receiving units, control and output a delay of the plurality of signals,
wherein
each of the plurality of sending units sends a phase adjustment signal for phase adjustment to be performed by the phase adjustment unit, and
a phase adjustment signal sent by a first sending unit out of the plurality of sending units includes a signal having a coordinate phase and an opposite phase with respect to a phase adjustment signal sent by a second sending unit out of the plurality of sending units.

2. The printing apparatus according to claim 1, wherein the phase adjustment unit comprises:
a delay circuit configured to output the plurality of signals after respectively delaying the plurality of signals by a plurality of delay times,
a determination circuit configured to determine, out of the plurality of signals delayed by the delay circuit, a signal included in a predetermined period, and
a selection circuit configured to, based on a determination result by the determination circuit, select and output a delay time by the delay circuit.

3. The printing apparatus according to claim 1, wherein, in the signal line, wiring lines for the plurality of sending units and the plurality of receiving units to perform sending/receiving run parallel.

4. The printing apparatus according to claim 1, wherein a corresponding sending unit and receiving unit perform sending/receiving of a signal by a differential transmission method.

5. The printing apparatus according to claim 1, wherein the coordinate phase or the opposite phase includes a signal having a plurality of patterns for patterns of at least two continuous symbols.

6. The printing apparatus according to claim 1, wherein a signal of the coordinate phase and a signal of the opposite phase are sent at a timing different from each other.

7. The printing apparatus according to claim 1, wherein one of the plurality of sending units is configured to send a clock signal.

8. The printing apparatus according to claim 7, wherein the phase adjustment unit adjusts a phase of a first signal sent by the first sending unit and a phase of a second signal sent by the second sending unit against the clock signal.

9. The printing apparatus according to claim 8, wherein, after adjusting the phase of the first signal and the phase of the second signal, the phase adjustment unit adjusts, based on the first signal and the clock signal, a phase of the clock signal.

10. A printing apparatus having a printhead, the printing apparatus comprising:
a memory device configured to store a set of instructions; and
at least one processor configured to execute the instructions stored in the memory device to function as:
a plurality of sending units configured to respectively send signals;
a plurality of receiving units provided on the printhead and respectively corresponding to the plurality of sending units, the plurality of receiving units configured to receive signals via a signal line; and
a phase adjustment unit configured to, based on a phase difference of a plurality of signals respectively received by the plurality of receiving units, control and output a delay of the plurality of signals,
wherein
each of the plurality of sending units sends a phase adjustment signal for phase adjustment to be performed by the phase adjustment unit, and
a phase adjustment signal sent by a first sending unit out of the plurality of sending units includes a signal having a coordinate phase and an opposite phase with respect to a phase adjustment signal sent by a second sending unit out of the plurality of sending units.

11. The printing apparatus according to claim 10, wherein the phase adjustment unit comprises:
a delay circuit configured to output the plurality of signals after respectively delaying the plurality of signals by a plurality of delay times, a determination circuit configured to determine, out of the plurality of signals delayed by the delay circuit, a signal included in a predetermined period, and a selection circuit configured to, based on a determination result by the determination circuit, select and output a delay time by the delay circuit.

12. The printing apparatus according to claim 10, wherein, in the signal line, wiring lines for the plurality of sending units and the plurality of receiving units to perform sending/receiving run parallel.

13. The printing apparatus according to claim 10, wherein a corresponding sending unit and receiving unit perform sending/receiving of a signal by a differential transmission method.

14. The printing apparatus according to claim 10, wherein the coordinate phase or the opposite phase includes a signal having a plurality of patterns for patterns of at least two continuous symbols.

15. The printing apparatus according to claim 10, wherein a signal of the coordinate phase and a signal of the opposite phase are sent at a timing different from each other.

16. The printing apparatus according to claim 10, wherein one of the plurality of sending units is configured to send a clock signal.

17. The printing apparatus according to claim 16, wherein the phase adjustment unit adjusts a phase of a first signal sent by the first sending unit and a phase of a second signal sent by the second sending unit against the clock signal.

18. The printing apparatus according to claim 17, wherein, after adjusting the phase of the first signal and the phase of the second signal, the phase adjustment unit adjusts, based on the first signal and the clock signal, a phase of the clock signal.

19. An apparatus for transmitting signals, comprising:

a plurality of sending units configured to respectively send signals;

a plurality of receiving units provided on a printhead and respectively corresponding to the plurality of sending units, the plurality of receiving units configured to receive signals via a signal line; and a phase adjustment unit configured to, based on a phase difference of a plurality of signals respectively received by the plurality of receiving units, control and output a delay of the plurality of signals, wherein each of the plurality of sending units sends a phase adjustment signal for phase adjustment to be performed by the phase adjustment unit, and a phase adjustment signal sent by a first sending unit out of the plurality of sending units includes a signal having a coordinate phase and an opposite phase with respect to a phase adjustment signal sent by a second sending unit out of the plurality of sending units.

* * * * *